Feb. 9, 1960     H. R. BILLETER     2,924,020
COMPARISON GAUGE

Filed April 4, 1957     8 Sheets-Sheet 3

Inventor:
Henry Robert Billeter
by Fidler, Crouse & Beardsley
Attorneys

United States Patent Office 2,924,020
Patented Feb. 9, 1960

2,924,020

COMPARISON GAUGE

Henry Robert Billeter, Deerfield, Ill., assignor to Ammco Tools Inc., Chicago, Ill., a corporation of Illinois Application April 4, 1957, Serial No. 650,678

13 Claims. (Cl. 33—174)

This invention relates to gauges and has to do more particularly with a gauge for measuring and indicating the difference in diameters of a bore and a cylindrical member to be fitted therein, such as a pin or rod. It is an object of the invention to provide an improved gauge of such character.

Gauges of the foregoing type, commonly known as "pin fitting gauges" have been extensively employed to compare the diameters of a bore and a cylindrical member such as a pin or rod, particularly in connection with the machining or grinding of the bore or pin to provide the desired fit of the pin in the bore. Certain types of such gauges as heretofore constructed are so formed that they require the operator to take separate readings of the diameter of the bore and the pin and compare them to determine the difference. In other types of prior pin fitting gauges the diameters of the bore and pin are measured simultaneously but the device is of such construction that it must be very accurately made to provide accurate results. Moreover, many of such prior gauges require relatively complicated and time-consuming manipulation in order to obtain the desired measurement and indication of the differences in the diameters.

It is an object of the invention to provide a gauge for measuring and indicating the difference in diameters of a bore and a rod or pin, which gauge directly indicates such difference upon a very simple and easy manipulation of the gauge.

Another object is to provide a gauge for accurately measuring and indicating the difference in diameters of a bore and of a pin or rod, which gauge requires a minimum of accuracy of the parts.

Still another object is to provide a gauge for measuring and indicating the differences in diameters of a bore and a pin or rod, which gauge can be preset to measure and indicate deviation from a preselected difference or clearance between the diameters of the pin or rod and the bore.

A further object is to provide a gauge for measuring and indicating the difference in diameters of a bore and a pin or rod providing a large amplification of the indication of the difference in diameters whereby minute actual differences in dimension produce relatively large scale indications on an indicating device.

Still another object is to provide a gauge for measuring and indicating the difference in diameters of a bore and a pin or rod in which wear of the parts does not materially affect the accuracy of the gauge, whereby the latter may remain accurate over a long period of use.

Another object is to provide a gauge for measuring and indicating the difference in diameters of a bore and a pin or rod in which there is a minimum of mechanical friction in the parts, whereby the gauge provides substantially identical readings upon successive measurements of similar dimensions.

Another object is to provide a gauge for measuring and indicating the difference in diameters of a bore and a pin or rod, the moving parts of such gauge being so arranged that any friction developed in the gauge between the gauging and the indicating means does not substantially affect the accuracy of the gauge.

A further object of the invention is to provide a gauge for measuring and indicating the difference in diameters of a bore and a pin or rod wherein movement and positioning of the gauging elements is transmitted to a liquid indicating means for indicating the relative positions of the gauging elements.

Still another object of the invention is the provision of a gauge for measuring and indicating the difference in diameters of a bore and a pin or rod wherein a fluid under pressure is provided for actuating the indicating means under control of gauging elements, whereby any mechanical friction developed in the gauge does not affect the accuracy of the gauge.

A further object is to provide a gauge for measuring and indicating the difference in diameters of a bore and a rod or pin wherein the movement of the portions of the gauge employed in effecting the measurement are damped, whereby there is substantially no oscillation of the indicating means and the reading may be made accurately and rapidly.

Still another object is to provide a gauge for measuring and indicating the difference in diameters of a bore and a pin or rod which can be operated by a relatively unskilled workman and with a minimum of training.

Other objects and advantages of the invention will appear from the following description taken in connection with the appended drawings wherein.

A gauge constructed in accordance with one embodiment of the invention is illustrated in Figs. 1 to 9 of the drawings to which reference now is made. The gauge includes a base 10 of generally rectangular, hollow construction having a front wall 11, a rear wall 12, side walls 13 and 14 and a top wall 15. The rear wall 12 is turned inwardly to form an exterior step or shelf 16. This shelf extends beyond the rear wall 12 and is of bifurcate construction to provide an open way 17 for a purpose hereinafter described. The base 10 is open at its bottom in order to permit the insertion therein and assembly therewith of the majority of the moving parts of the gauge in a manner which will subsequently become apparent.

A scale housing 20 is secured to the top wall 15 of the base 10, the housing 20 being provided with laterally extending flanges 21 at its lower portions through which suitable securing screws extend and are threaded into the top wall 15. The scale housing 20 is of generally hollow construction as described more in detail hereinafter.

Figures 4, 6, 7:
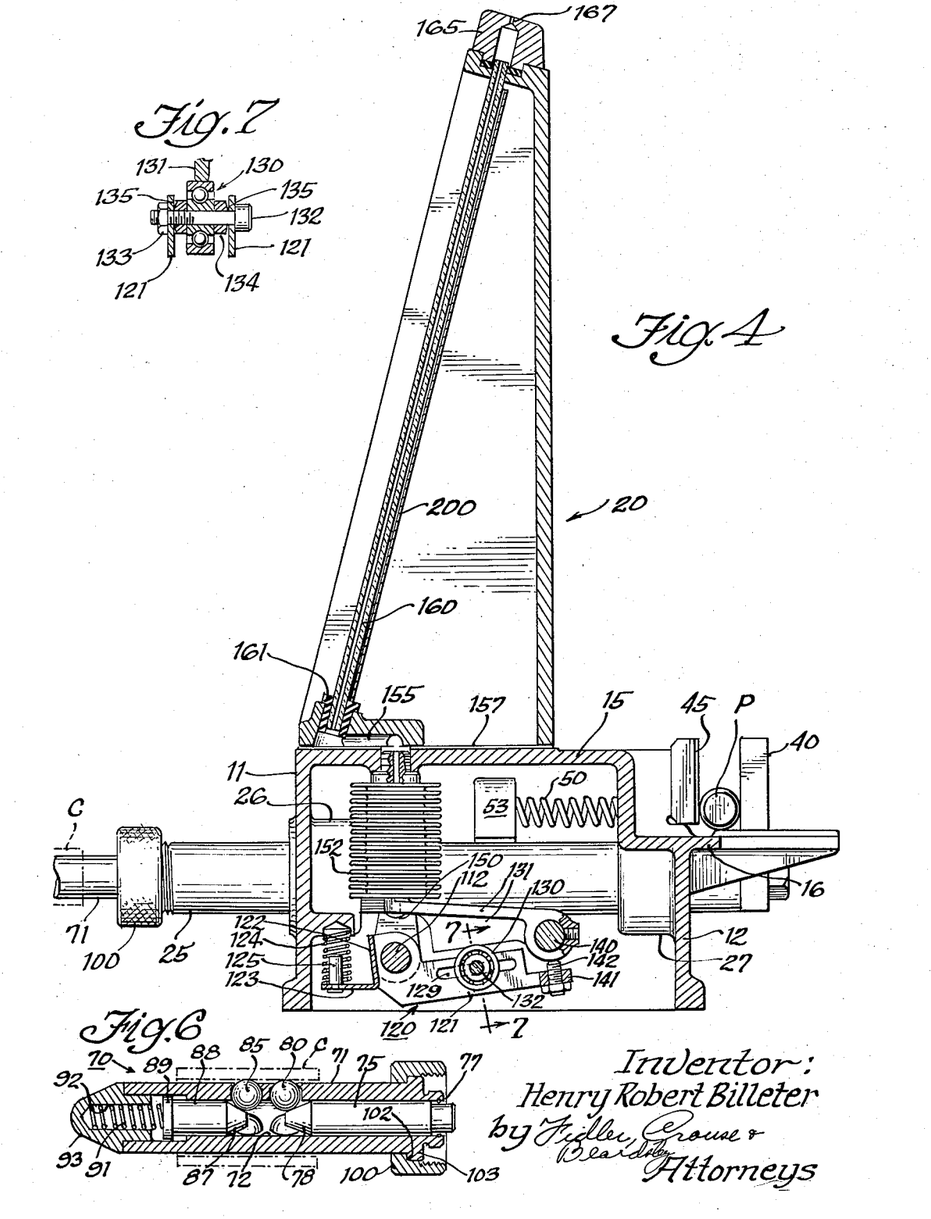
Fig. 4 is a vertical sectional view taken along line 4—4 of Figs. 1 and 3.
Fig. 6 is an enlarged, fragmentary sectional view taken along line 6—6 of Fig. 5.
Fig. 7 is a fragmentary sectional view taken along line 7—7 of Fig. 4.
Figures 5, 8, 9:
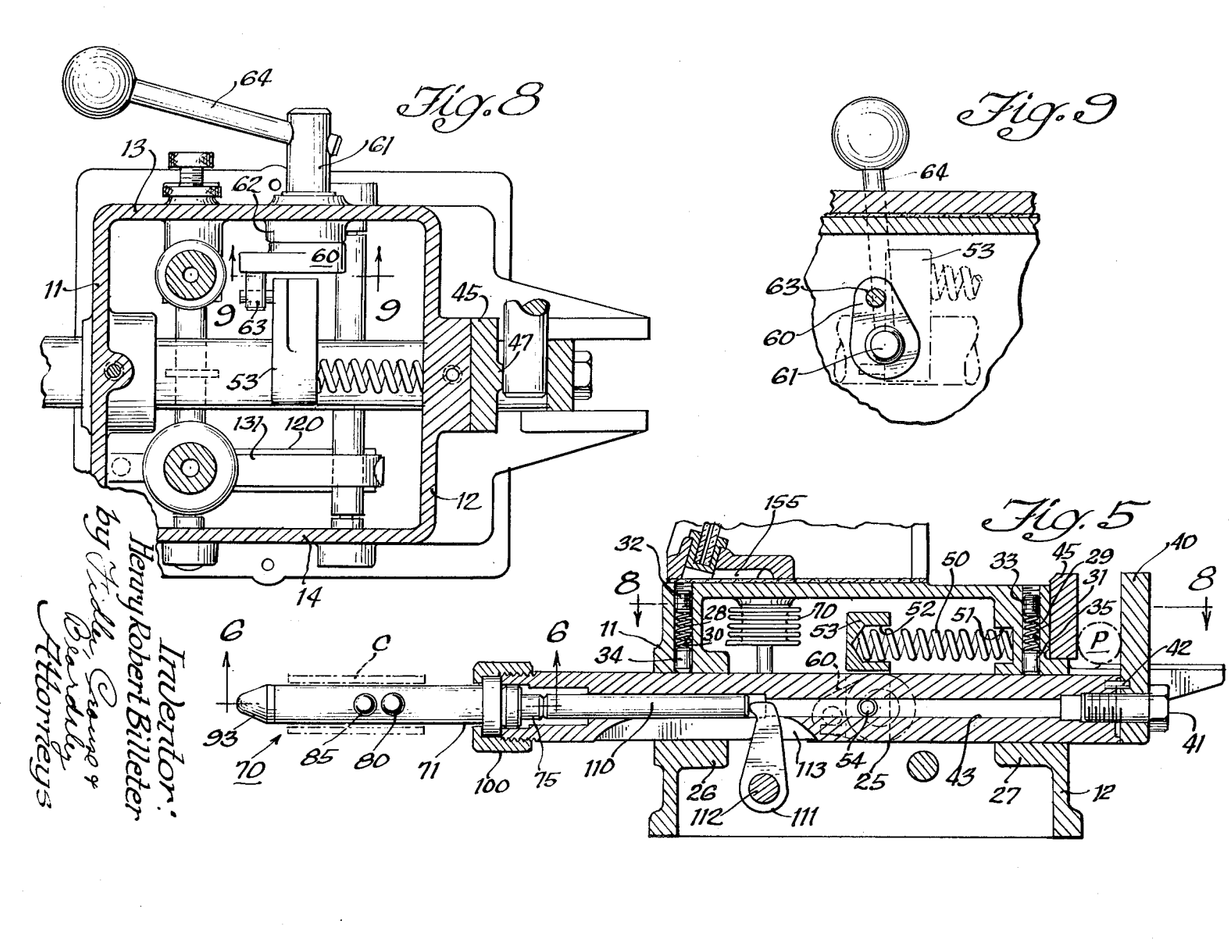
Fig. 5 is an enlarged fragmentary sectional view taken along line 5—5 of Fig. 3.
Fig. 8 is an enlarged sectional view taken along line 8—8 of Fig. 5.
Fig. 9 is a fragmentary sectional view taken along line 9—9 of Fig. 8.

Slidable in the base 10 for movement in a fore-and-aft direction is an arbor 25 as best seen in Figs. 4 and 5. The arbor is slidably supported in a pair of bearings 26 and 27, preferably formed integrally with and extending inwardly from the front and rear walls 11 and 12 respectively and of sufficient length to provide substantial bearing surfaces for the arbor 25 to guide it in its sliding movement. Means are provided for maintaining the arbor firmly against the bottoms of the bearings in order to minimize inaccuracies which might otherwise occur as a result of slight play of the arbor within the bearings. These means include springs 28 and 29 disposed in bores 30 and 31 formed in the front and rear walls of the base 10 respectively. Fixed plugs 32 and 33 are threaded into bores 30 and 31 respectively and adjustably compress the springs 28 and 29 to bias the corresponding plugs 34 and 35 downwardly against the arbor 25.

Carried at the rear end of the arbor 25 is a caliper jaw member 40 which is secured to the end of the arbor as by a screw 41 threaded into the enlarged end of a bore 43 which extends longitudinally throughout the length of the arbor 25. The caliper jaw 40 is rigidly secured in upstanding position by a pin 42 entering suitably arranged sockets in the rear end of the arbor 25 and the caliper jaw 40. The caliper jaw 40 is so arranged and proportioned that it projects upwardly through and is slidably guided in the way 17.

Figure 1:
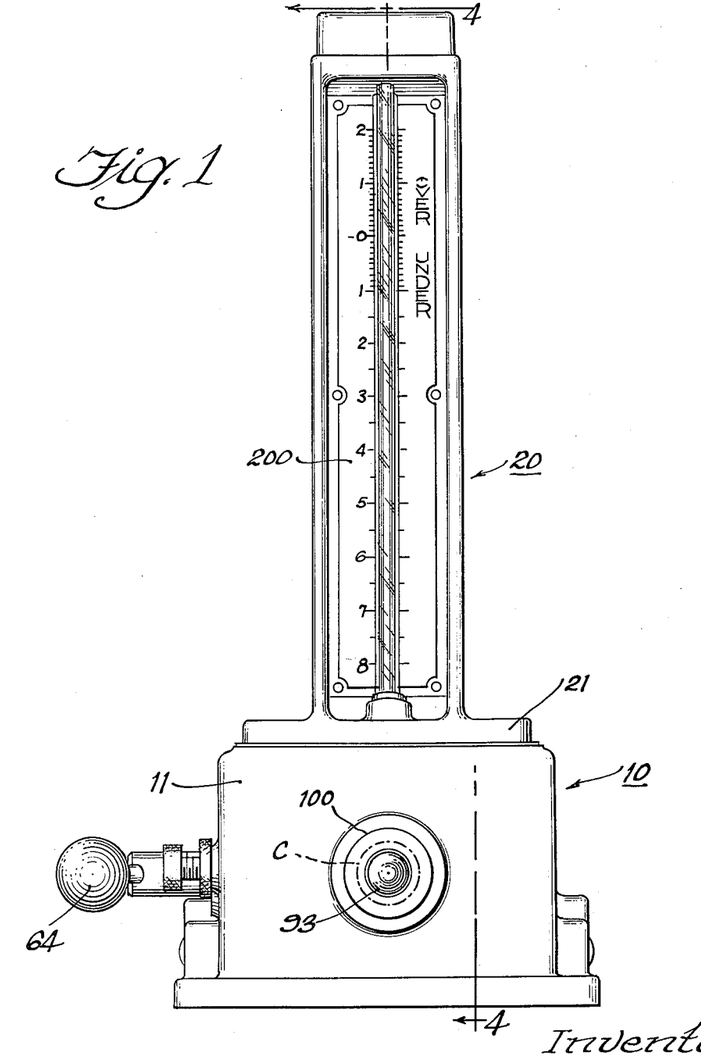
Figure 1 is a front elevational view of a gauge constructed in accordance with one embodiment of the invention.
Figure 2:
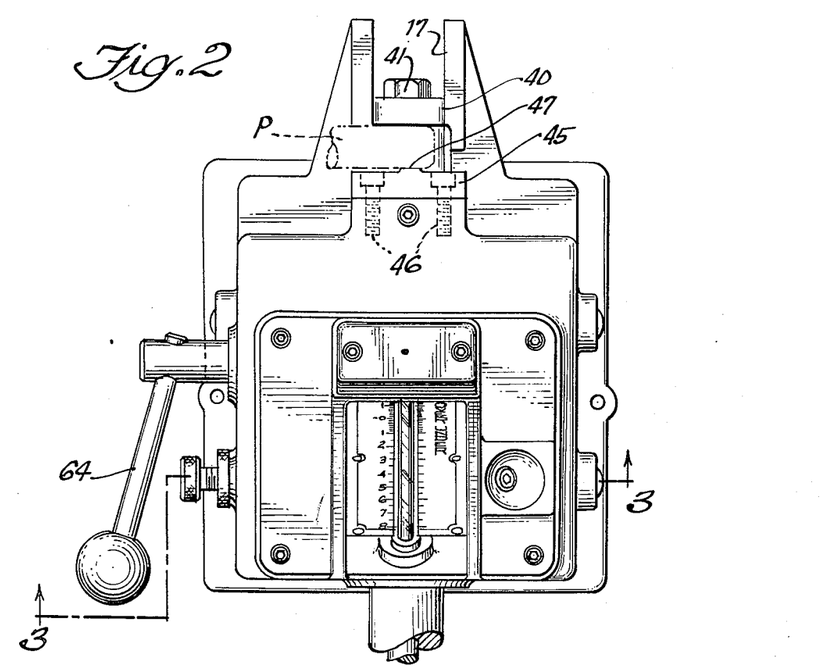
Fig. 2 is an enlarged top plan view of the gauge of Fig. 1.

A fixed caliper jaw 45 is rigidly secured to the rear wall of the base 10 as by screws 46, seen in Fig. 2, extending through the jaw 45 and into the base 10. The fixed jaw 45 is disposed with its face in opposition to the inner face of the movable jaw 40 and is provided with a vertically extending, raised boss 47 having a flat planar face adapted to receive between it and the inner face of the movable jaw 40 a cylindrical member such as the pin P to be gauged.

Where the term "pin" is used herein it designates the male member to be gauged and it will be understood that this term includes not only pins but rods and other cylindrical members. Similarly where the term "cylinder" is used herein it designates the female member to be gauged and it designates not only cylinders but other members having bores or cylindrical openings therein to be gauged.

The movable jaw 40 is normally urged yieldably in a direction toward the fixed jaw 45 in order to cause it to engage between its inner face and the gauging face of the fixed jaw 45 the pin P to be gauged. To this end a spring 50 is provided which at one end is seated in a socket 51 formed on the inner face of the rear wall 12 above the arbor 25 and at its other end is seated in a socket 52 formed in a release pad 53 secured to the arbor by a screw 54. The spring 50 is under compression at all times and therefore acts to urge the arbor forwardly (to the left as viewed in Figs. 4 and 5) thereby to urge the movable jaw 40 toward the fixed jaw 45. Preferably the spring 50 acts along a line which is parallel to the arbor 25 and passes through the position of the pin P, since this minimizes torque applied to the arbor by the spring.

Releasing means are provided for sliding the arbor 25 rearwardly against the force of the spring 50 and hence for moving the jaw 40 away from the jaw 45 to permit insertion or removal of the pin P to be measured. The releasing means include a release arm 60 (see Figs. 5 and 8) fixed on a release shaft 61 journalled in a bearing 62, preferably formed integrally with the left hand side wall 13. Projecting inwardly from the inner face of the release lever 60 and extending parallel to but spaced from the axis of shaft 61 is a pin 63 positioned to engage the forward face of the release pad 53. When the lever 60 is rotated the release pad 53 and the arbor 25 are moved rearwardly to open the rear jaw 40. The shaft 61 projects from the base side wall 13 and carries on a projecting portion a release handle 64 by which the shaft may be readily rotated.

The arbor 25 projects from the front wall 11 of the casing as seen particularly in Figs. 5 and 6. Carried at the forward end of the arbor 25 is a mandrel 70 adapted to receive a member such as the cylinder C and having a bore or cylindrical opening to be gauged. The mandrel 70, the details of which are best shown in Fig. 6, includes a tubular body 71 having a bore 72 extending therethrough and having an enlarged outer end. Slidably disposed in the inner end of the bore 72 is an expander pin 75 having a reduced diameter inner end portion projecting from the inner end of the mandrel. A retainer 77, preferably formed from spring wire and having a generally C-shaped form, is disposed in a suitably arranged groove in the mandrel body 71 adjacent the inner end. This retainer is engageable with a shoulder on the pin 75 and thereby serves to prevent the pin from moving out of the bore 72.

At its forward end the pin 75 is formed with a conical end portion 78 adapted to cooperate with a plurality of gauging balls 80 (preferably three in number) each disposed in an opening formed in the walls of the body 71. The openings are preferably arranged at equal angles around the periphery of the body 71, and the mandrel 70 is staked or peened around the openings in order to prevent the balls 80 from passing outwardly through the openings. However, the openings are of such size, and the retaining means is so arranged, as to permit the balls to move outwardly in the openings to a limited extent and to project at least partially from the periphery of the mandrel body 71. Inward movement of the balls 80 is limited by the tapered end 78 of the pin 75. From the foregoing it will be seen that the inward movement of the balls 80 causes the pin 75 to be displaced inwardly whereas the outward displacement of the pin 75 spreads the balls 80 apart.

It will be seen that when the member C to be gauged is inserted over the mandrel 70 the inner wall of the member will engage the outer portions of the balls 80 and cause them to be contracted or moved inwardly to an extent determined by the diameter of the bore in the member C, and, accordingly, to displace the pin 75 inwardly to a corresponding extent. The pin 75 is yieldably urged outwardly in a manner explained below.

In the illustrated embodiment of the invention it is necessary that longitudinal movement of the pin 75 be in one-to-one relationship to the difference in diameters of the cylinder bores slipped over the balls 80. This follows from the fact that the gauge is to indicate or measure the difference in diameters of a pin and a bore, both of which may vary, and that there is a one-to-one relationship between movement of the arbor 25 and the diameter of pins P within the jaws 40 and 45. Accordingly, the slope of the conical end of the pin 75 is that angle whose tangent is .500 or approximately 26½ degrees. In this case a difference of .001 inch in the diameter of two bores as gauged will cause relative pin movement of .001 inch.

Means are provided for aligning and centering the member C on the mandrel 70 so that it causes each of the balls 80 to be moved inwardly the same amount and thereby effect equal displacement forces upon the expander pin 75. A second set of balls 85 is arranged in additional openings in the body 71 in a manner generally similar to the balls 80. The balls 85 are arranged to bear against the tapered end portion 87 of a centering expander pin 88. The pin 88 is slidable in the bore 72 and has an enlarged head 89 slidable in an enlarged outer end portion of the bore 72.

A spring 91 urges the centering expander pin 88 inwardly and hence urges the balls 85 outwardly. The spring 91 is seated at one end against the pin head 89 and is received in a socket 92 formed in an end plug 93 which is press fitted into the outer end of the bore 72. The arrangement is such that each of the balls 85 is urged outwardly in a similar manner and to a similar extent by the centering expander pin 88. Thus, when a cylinder such as the member C is placed on the mandrel 70, the balls 85 will be contracted to the same extent, and since the balls are arranged at equal angles around the periphery of the mandrel body 71, the member C will be retained on the mandrel in coaxial relation therewith.

The mandrel 70 is secured on the forward end of the arbor 25 by a retaining collar 100 having an interior shoulder engageable with a flange formed on the mandrel body 71 to retain the collar 100 on the mandrel body, all as clearly shown in Fig. 5. The collar is internally threaded such that it may be screwed onto the end of the arbor 25 which is complementally threaded. When in position on the arbor 25, as shown in Figs. 4 and 5, the inner face of the shoulder 103 abuts the face or end of the arbor 25 and the inner end of the mandrel body projects into the arbor. The inner end of the expander pin 75 projects beyond the mandrel body and into the arbor, as is best seen in Fig. 5.

As explained above the gauging balls 80 may extend outwardly of the mandrel body 71 a distance determined by the diameter of the bore being gauged. In other words, the diameter of the bore determines the position of the several gauging balls 80, and more particularly the diameter of a circle passing around and tangent to the outermost portions of the balls. The position of the balls, in turn, determines the position of the expander pin 75 against which the balls 80 bear. The embodiment of the invention being described includes means for indicating the position of the pin 75, and hence the position of the balls 80 and the inner diameter of the member C.

Slidably disposed within the arbor 25 at the forward portion thereof and engageable with the inner end of the expander pin 75 is a plunger 110, seen best in Fig. 5. The plunger 110 at its inner end is engageable with a lever 111 mounted on a pivot shaft 112, the shaft being located below the arbor 25. The arbor 25 is formed with an elongated slot 113 extending along its lower portion for receiving the lever 111 and permitting it to project into the arbor in oposition to engage the inner end of the plunger 110. It will be seen that the lever 111 swings in accordance with the position of the plunger 110 and rocks the shaft 112 accordingly. The slot 113 is, of course, of such length as to permit this movement to take place throughout the desired ranges of movement of the arbor 25 and of the plunger 110, as described below.

Figure 3:
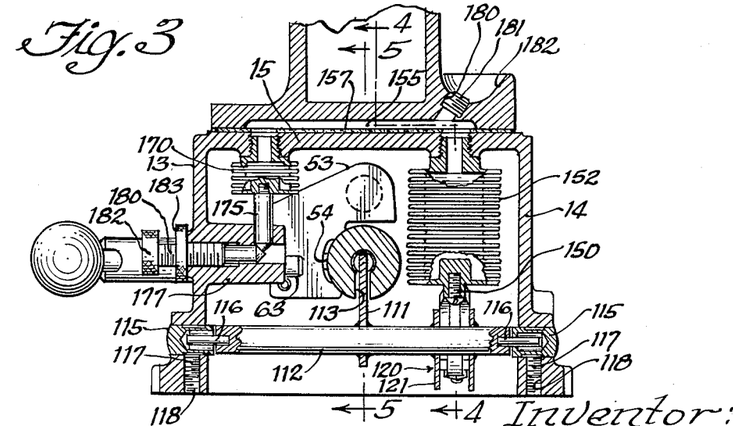
Fig. 3 is a fragmentary vertical sectional view taken along line 3—3 of Fig. 2.

As may be seen in Fig. 3 the shaft 112 is supported in a pair of bearings 115 through pins 116 secured in the ends of the shaft. In order that pivotal movement of the shaft 112 may be as nearly frictionless as possible it is preferred that the bearings 115 be needle bearings. The bearings are shown in Fig. 3 supported in the sidewalls 13 and 14 and are held in place by set screws 117 threaded into bores 118.

Also secured on the shaft 112 is a lever 120 (Figs. 3 and 4), preferably in the form of a U-shaped member having parallel leg portions 121 connected by a web portion 122 from the bottom of which extends an arm 123. The lever 120 is urged in a counterclockwise direction (as viewed in Fig. 4) by a spring 124. The spring 124 is seated at one end in a suitable socket formed in an inwardly projecting portion of the base 10, as shown, and bears at its other end against the arm 123 and is retained thereon by an upstanding pin 125.

The arms 121 of the lever 120 are formed with parallel slots 129 and they support between them a ball bearing 130, the outer race of which is arranged to bear against the underside of a lever 131. The ball bearing 130 is supported on the arms 121 by a screw 132 (Fig. 7) which extends through the slots 129 and is secured by a nut 133. The bearing is positioned medially of the legs 121 by suitable spacers 134, and spring washers 135 are interposed between each spacer and the corresponding leg 121. The position of the ball bearing 130 may be adjusted along the length of the legs 121 of the primary lever 120 whereby the ball bearing may be made to bear against the underside of the secondary lever 131 at selected points for a purpose hereinafter explained.

The lever 131 is supported on a shaft 140 which is pivotally supported in the base 10 in a manner similar to the shaft 112 in a position spaced rearwardly of and slightly above the level of the shaft 112. The lever 131 is adapted to be rocked about the axis of the shaft 140 by the rotation or rocking movement of the lever 120 acting through the ball bearing 130. As viewed in Fig. 4, counterclockwise movement of the lever 120 about the axis of the shaft 112 will cause the ball bearing to engage the underside of the lever 131 and rock the latter in a clockwise direction about the axis of the pivot shaft 140. Depending upon the adjusted position of the ball bearing 130 on the lever 120, the lever 131 will be rocked to a greater or lesser extent by any particular regular movement of the lever 120.

A nut 141 is secured between the ends of the legs 121 and a stop screw 142 is threaded therein. The screw 142 is thus positioned to abut the hub of the lever 131 and limit angular movement of the lever 120 in a counterclockwise direction about its pivot axis.

The slots 129 in the legs 121 are so located and so oriented that when the lever 121 is in its full counterclockwise position with the screw 141 engaging the hub of the lever 131, a line drawn between the axes of the shafts 112 and 140 is tangent to the outer periphery of the ball bearing 130. Also, the lower edge or surface of the lever 131 extends radially of the shaft 140. Thus any adjustment of the ball bearing 130 along the primary lever 120 will change the effective lengths of the levers 120 and 131 but will not alter their relative angular positions when the lever 120 is in its full counterclockwise position. Accordingly, adjustment of the ball bearing 130 along the slots 129 will alter the ratio of angular movement of the levers 120 and 131 but does not alter their respective zero or base positions, these latter being the positions shown in Fig. 4.

Adjustable positioning of the ball bearing 130 along the lever 120 alters the rate at which the indicating apparatus, described below, responds to the bore and pin sensing apparatus. It is contemplated that adjustment of the ball bearing 130 be made by the manufacturer to correct for deviation from standard of the internal diameter of a capillary tube employed in the indicating apparatus and referred to below.

The outer end of the lever 131 is connected as by a screw 150 to the bottom of a bellows 152 whose upper end is secured to the top wall 15 in any suitable manner. The upper end of the bellows opens into a passage 155 defined between the lower portion of the scale housing 20 and the top wall 15. A gasket 157, secured between the scale housing 20 and the base 10, is provided with an opening to permit communication between the bellows and the passage 155.

The passage 155 extends to and communicates with a capillary tube 160 which is supported at its lower end in a bushing 161 secured in the base portion 21. At its upper end the capillary tube extends through an opening in the upper end of the housing 20 and opens into a recess formed in a cap member 165 which is secured to the upper end of the housing 20, the recess in the cap 165 being open to the atmosphere through a capillary passage 167. A suitable indicating liquid, preferably colored, is placed in the bellows 152 in sufficient quantity to fill the bellows, the passage 155 and other spaces hereinafter described, and to fill the capillary tube 160 partially. The liquid is inserted through a filling opening 180 (see Fig. 3) formed in the base of the scale housing 20 and closed by a screw plug 181, a funnel-like depression 182 being provided above the filling opening for convenience in inserting the liquid. The liquid which is used should have low viscosity, a low coefficient of thermal expansion and a high boiling point. Oil which is commonly known in the art as "red-oil" is suitable for the purpose.

Operation of the gauge is explained in detail below. It should be understood at this point, however, that inward movement of the balls 80 by the cylinder C moves the pin 75 and the plunger 110 to the right with respect to the mandrel in Figs. 5 and 6, pivots the lever 120 clockwise and the lever 131 counterclockwise, and permits expansion of the bellows 152 and lowering of the indicating liquid in the tube 160. Also, maintenance of the jaw 40 and the arbor 25 to the right by a pin P holds the entire mandrel 70 to the right and tends to cause lowering of the indicating liquid in the capillary tube in a manner described more in detail hereinafter. It will be seen that liquid level is therefore a function of pin size and cylinder bore diameter, pin size determining the position of the arbor and the entire mandrel, and cylinder bore size determining the position of the plunger 110 with respect to the arbor. A larger pin or a smaller cylinder bore diameter causes lowering of the liquid, and a smaller pin or a larger cylinder bore diameter causing a raising of the liquid in the capillary tube.

Means are provided for adjusting the height of the indicating liquid in the tube 160 in order to select a desired zero or base point. A second bellows 170 is provided which preferably is substantially smaller than the bellows 152 in order to permit fine adjustment. The upper end of the bellows 170 opens into the passage 155 as shown and is thereby connected to the above described indicating liquid system including the bellows 152, the passage 155 and the tube 160. The lower end of the bellows 170 has a plunger 175 secured thereto and extending downwardly therefrom. Arranged below the bellows 170 is a cylindrical projection 177 extending inwardly from the side wall 13 and preferably integral therewith. The projection 177 has a vertical bore receiving the lower end of the plunger 175 and has a horizontal bore in the same vertical plane receiving an adjusting screw 180.

The adjusting screw 180 is threaded into the horizontal bore and the inner ends of the adjusting screw and the plunger 175 are preferably tapered at complementary angles such that they make line contact with each other. The screw 180 has a knurled head 182 by which it may be turned and carries a knurled lock nut 183 by which it may be locked in any position of adjustment.

It will be seen from the foregoing that the position of the plunger 175 and consequently the volume of the bellows 170 may be adjusted by loosening the lock nut 183 and screwing the screw 180 either inwardly or outwardly.

Thus if it is desired to raise the level of the liquid in the capillary tube 160 the screw 180 is screwed inwardly to raise the plunger 175 and force liquid out of the bellows 170 which decreases the volume of the liquid containing space in the system and causes the liquid level to rise in the capillary tube 160. Conversely, if it is desired to lower the level of the fluid in the capillary tube 160 the screw 180 is backed off to allow the plunger 175 to move downwardly and the bellows 170 to expand and draw indicating liquid from the capillary tube.

Secured in the casing 20 behind the capillary tube 160 is a scale 200 having suitably spaced graduations thereon and successive digits indicating the height of the liquid above or below a zero line on the scale. Preferably the gauge is dimensioned, and calibrated by adjustment of the roller bearing 130 described above, such that a difference of 0.001 inch between the diameter of the pin and the inner diameter of the cylinder C produces a movement of the column of liquid in the capillary tube equal to one inch. Thus it will be seen that a very small difference in dimensions will produce a very large change in the level of the liquid column.

Preferably the gauge is provided with a standard plug of cylindrical form having an accurately machined surface of known diameter and a similar standard ring corresponding to the standard plug. The standard plug and standard ring are used for calibrating the gauge before a gauging operation, preferably before any operation following a substantial period of time during which the gauge has not been used, or when the temperature surrounding the gauge has changed since the previous calibration. It should be noted, however, that the standard plug and ring need not be of the precise desired diameter or diameters. They may deviate substantially from standard as long as the actual diameters are known, such that the gauge may be calibrated accordingly.

The gauge is provided with a plurality of detachable mandrels of different sizes and corresponding to the several ranges of sizes of pins and cylinders to be gauged. For example, one mandrel may be provided for gauging pins and cylinders ranging in diameters from 0.718 inch to 0.964 inch and another mandrel may be provided for gauging pins and cylinders ranging in diameter from 0.955 inch to 1.263 inches. Mandrels of other sizes for gauging pins and cylinders of other ranges or sizes may be provided as necessary or desired. It will be understood that for each such mandrel, a corresponding standard plug and standard ring are provided. However, it is necessary to provide only one standard plug and one standard ring for each mandrel regardless of the fact that any one mandrel can be used for gauging pins throughout a considerable range of diameters since the standard plug and ring will permit calibration of the gauge to the mandrel.

When the gauge is to be used, the appropriate mandrel is selected for the pin and cylinder to be gauged and is screwed onto the end of the arbor 25. The corresponding standard plug and ring are then selected. The jaws 40 and 45 are opened by rocking the release lever 64 in an upwardly and rearwardly direction (clockwise as viewed in Fig. 9) to move the arbor 25 rearwardly. The standard plug is then disposed between the jaw faces and the release lever is released, whereupon the spring 50 urges the arbor forwardly to close the jaws upon the plug. With no ring or cylinder disposed over the mandrel 70 the balls 80 are at the outer limit of their movement and the pin or plunger 75 is forward (inward of the mandrel body 71) at the limit of its movement in that direction. Accordingly the levers 111 and 120 are in their counterclockwise positions wherein the limit screw 142 bears against the hub of the lever 131. The lever 131 is thereby maintained in its clockwise position wherein it compresses the bellows 152 and maintains a high liquid level in the capillary tube 160.

The corresponding standard ring is then slipped onto the mandrel 70 into a position wherein it engages the centering balls 85 and the gauging balls 80. The standard ring will force the balls 80 inwardly toward the axis of the mandrel and will effect a corresponding rearward movement of the pin 75 and the plunger 110, and clockwise rotation of the levers 111 and 120. This allows counterclockwise movement of the lever 131 and expansion of the bellows 152, whereupon the level of the liquid in the capillary tube 160 falls correspondingly.

Assuming that the internal diameter of the standard ring is the same as the external diameter of the standard plug, then the level of the liquid in the capillary tube 160 should be at the zero mark on the scale. If the level of the liquid is not at the zero mark, the gauge is calibrated by suitable manipulation of the adjusting screw 180 to bring the level of the liquid in the capillary tube to the desired point. The standard ring is then removed from the mandrel, and the jaws are opened and the standard plug is removed. The gauge is then ready for operation.

The gauge of the present invention permits the operator to set it for any desired clearance of reasonable value between the pin and the internal diameter of the cylinder. For example, let it be assumed that it is desired that the diameter of the pin be 0.2 mil less than the diameter of the cylinder. The gauge is first calibrated with the standard plug and cylinder and then the adjusting screw 180 is adjusted in order to bring the level of the liquid opposite the 0.2 mil scale division below the zero mark. The gauge is then calibrated for indicating directly any discrepancy between the actual difference in diameters and the desired 0.2 mil clearance.

Let it now be assumed that a pin and cylinder are to be gauged and it is desired that the pin be 0.2 mil smaller in diameter than the cylinder. The pin is inserted in the jaws in a manner similar to that described above in connection with the calibrating of the gauge, and the cylinder is slipped onto the mandrel. If the pin is the desired 0.2 mil smaller than the cylinder the liquid will stand at the zero level in the capillary tube. On the other hand, if the internal diameter of the cylinder C exceeds the external diameter of the pin P by more than 0.2 mil, the reading on the scale will not be zero, but will indicate a corresponding excess dimension. For example, if the internal diameter of the cylinder C is 0.3 mil greater than the external diameter of the pin P, the level of the liquid will stand opposite the 0.1 mil scale division above the zero mark, and the operator will know that the cylinder is 0.1 mil too large (0.3 mil larger than the pin).

From the foregoing it will be seen that the invention provides a gauge which is extremely simple to use and requires no particular skill or training but which at the same time may be used for highly accurate gauging operations. The arrangement is such that there is a very large multiplication of movement effected within the gauge by reason of the use of a large bellows and a small diameter capillary tube. The apparatus permits not only great sensitivity but a high degree of accuracy, even though various parts of the gauge itself are not constructed with any unusual degree of accuracy. In fact the only critical dimension in the entire gauge is the angle of slope on the conical front end of the plunger or pin 75. Thus the gauge may be made relatively inexpensively and without unusual care or skill in manufacture and assembly.

The use of liquid for transmitting the force from the balls 80 to the liquid in the capillary tube provides a construction in which there is substantially no friction and no sticking. For this reason the gauge "repeats" with a high degree of accuracy. In other words, the gauge permits the taking of a number of readings with assurance that each of such readings will be the same as the preceding readings provided that the pin and cylinder to be gauged have the same dimensions in each case. Moreover, the fluid in the system has a damping effect which permits rapid reading of the device and it is therefore not necessary to wait for the device to stabilize as is the case with certain mechanical gauges wherein there is a substantial degree of oscillation or vibration which prevents rapid reading of the indication made by the gauge.

A second form of my invention is illustrated in Figs. 10 to 17 in the drawings to which reference now is made. In this embodiment of the invention the means for obtaining an initial, small scale physical signal corresponding to the difference in diameter of the pin and the bore are similar to the corresponding means of the first described embodiment of the invention. However, the means for obtaining an amplified signal proportional to this initial signal differs somewhat from the means incorporated in the first described embodiment of my invention, particularly in that it provides for power amplification of the signal rather than only amplification of the magnitude of the signal.

The gauge includes a base 200 having a front wall 201, a rear wall 202 and side walls 203 and 204. Projecting rearwardly from the rear wall is a shelf 205 of bifurcate construction providing an open way 206. Mounted on the base 200 and suitably secured thereto is a scale housing 210 formed with a lower shell-like portion 211 which serves as a cover for the base 200, and an upwardly projecting portion 212 which serves to support a scale and to house a pointer, both hereinafter described.

An arbor 215 which is formed in a manner generally similar to the arbor 25 above described is slidably supported in bearings 216 and 217 formed in the rear and front walls of the base 200. The arbor 215 is urged in a forward direction (to the right in Fig. 13) by a spring 218 which is seated at one end against the arbor bearing 216 and at the other end bears against a ring 219 secured on the arbor 215. Carried at the rear end of the arbor is a caliper jaw member 220 which is secured to the arbor 215 in a manner similar to that described in connection with the jaw member 40. A fixed jaw 221 is secured to the base 200 as by screws 222, the two jaws being arranged to receive a pin P therebetween.

Figures 11, 14, 15, 16, 17:
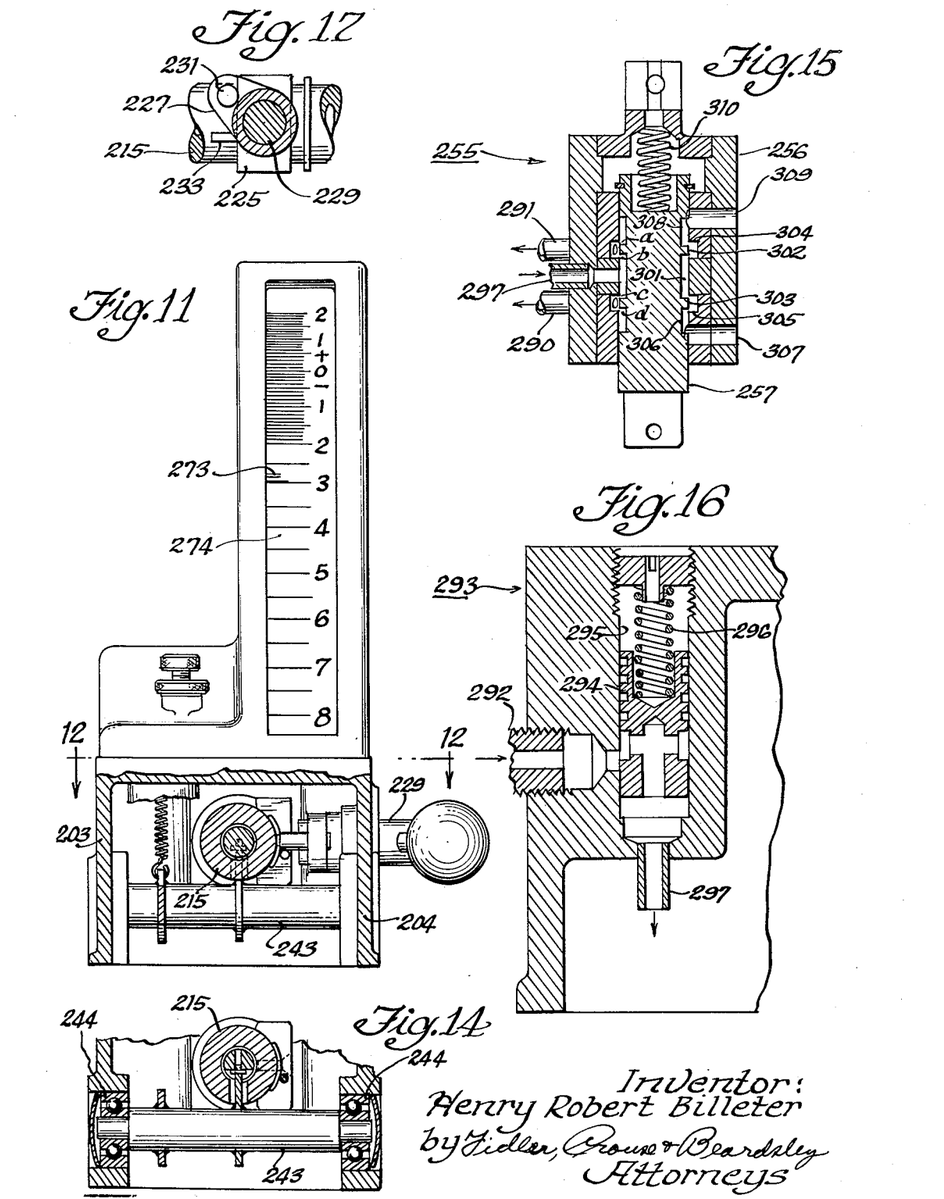
Fig. 11 is a front elevational view, with parts broken away and in section, of the gauge of Fig. 10.
Fig. 14 is a fragmentary sectional view taken along line 14—14 of Fig. 13.
Fig. 15 is an enlarged fragmentary sectional view taken along line 15—15 of Fig. 12.
Fig. 16 is an enlarged fragmentary sectional view taken along line 16—16 of Fig. 12.
Fig. 17 is a fragmentary sectional view taken along line 17—17 of Fig. 12.

Release means are provided for moving the arbor rearwardly against the force of the arbor spring 218 in order to open the caliper jaws 220 and 221. Such release means include a release pad 225 secured to the arbor as by a screw 226, seen in Fig. 13. A release arm 227 is secured as by a set screw 228 on a release shaft 229 journaled in a bearing 230 in the side wall 204 of the base. The release arm 227 carries at its free end a pin 231 which is adapted, when the release arm is rotated, to bear against the release pad 225 and urge the same rearwardly, thereby to cause the arbor 215 to move rearwardly. Secured to the outer end of the release shaft 229 is a handle 232 for actuating the same. A stop 233 projects from the forward face of the release pad for stopping rotation of the release arm 227 with the pin 231 at its forwardmost position, all as best seen in Fig. 17.

The arbor 215 projects from the forward face of the base 200 and carries thereon a mandrel 235 which may be the same in all respects as the mandrel 70 hereinabove described, and which therefore is not again described in detail. Slidable in the mandrel 235 is a pin 236 which is generally similar to the corresponding pin 75 in the first embodiment of the invention but projects farther into the arbor. The inner or rear end of the pin 236 abuts a ball-like end portion 238 of a plunger 239 slidable in the arbor 215.

The plunger 239 has a notch 240 therein which receives a pin 241 carried at the free end of a lever 242. The lever 242 is secured to a shaft 243 which is journaled in bearings 244 (see Fig. 14). The bearings 244 are secured in the side walls 203 and 204 of the base 200 and may be of the same construction as the bearings 115 of the previously described embodiment. The lever 242 extends into the arbor through a slot 246 of such length as to permit the necessary rocking movement of the lever to any position of adjustment of the arbor 215 as in the first described embodiment of the invention.

Fixed on the shaft 243 for rocking movement therewith is a lever 250 (Fig. 10) which is normally restrained yieldably against downward movement (clockwise movement as viewed in Fig. 10) by a spring 251 secured at one end to the lever 250 and at the other end to a spring anchor 252 secured in the upper wall of the base 200. The purpose of the spring 251 is to reduce the clockwise torque or back pressure applied to the lever 250 and shaft 243 by another spring described below. A plurality of holes 253 are provided in the lever 250, spaced at different distances from the shaft 243, and the lower end of the spring 251 may hook into any one of these holes, selectively, to produce the desired counterbalancing.

It will be seen that rearward movement of the pin 241 and the lever 242 by application of a cylinder C to the mandrel 235 will cause upward movement of the lever 250 since both are secured to a common shaft 243. Upward movement of the lever 250 is transmitted to the ultimate indicating device through fluid amplifying means including a valve mechanism 255, seen in Fig. 10 and shown in greater detail in Fig. 15. The function of the valve 255 is to control the flow of fluid under pressure to provide power for producing large scale indications in response to movements of the arm 250.

The valve mechanism 255 includes a body portion 256 and a slidable valve member 257, the lower end of the valve member 257 being pivotally connected to the free end of the arm 250 through a pin 258, and the body 256 being pivotally supported or hung from a lever 260 through a pin 261. The lever 260 is in turn pivotally supported on a pin 262 closely adjacent the pin 261, the pin 262 being supported by a lever 265 paralleling the lever 260.

Figure 12:
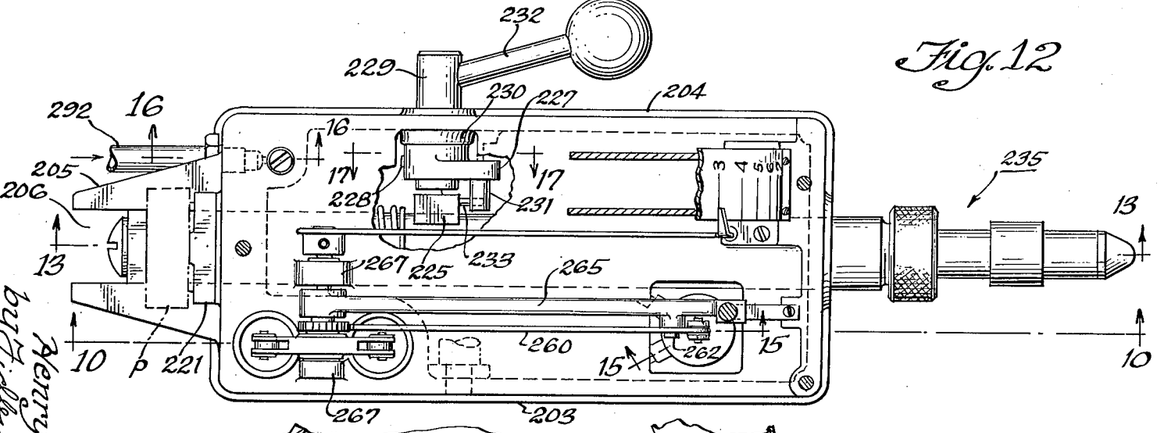
Fig. 12 is a horizontal sectional view taken along line 12—12 of Fig. 11.
Figure 13:
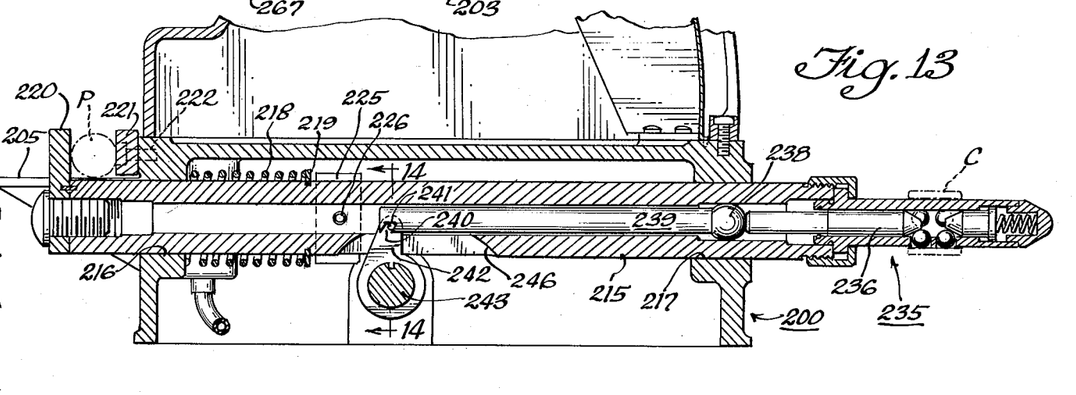
Fig. 13 is a fragmentary vertical sectional view taken along line 13—13 of Fig. 12.

The left hand end of the lever 265 is freely pivotable about a shaft 266 which is supported between a pair of bearings 267 as seen in Fig. 12. The other end of the lever 265 is held downwardly by a thumb screw 268 against a leaf spring 269 which is supported by the base 200. A thumb nut 270, threadedly engaging the thumb screw 268, serves to lock the screw in any selected position. It will be seen that the right hand or forward end of the lever 265 may be selectively positioned vertically by operation of the thumb screw 268 and the thumb nut 270, whereby the pin 262, which is the pivotal axis of the lever 260, may be adjusted very sensitively in a vertical direction.

The left hand end of the lever 260 carries gear teeth centered about the pin 262. These gear teeth mesh with a gear 271 which is mounted on and secured to the shaft 266. Also secured to the shaft 266 is an indicator arm 272 which extends upwardly and to the right within the housing 210. At its outer or free end the arm 272 carries a pointer 273 which may move along an arcuate scale 274 as seen best in Fig. 11. The housing 210 is open or has a transparent window overlying the scale 274 such that indications by the pointer 273 may be seen.

A double-acting piston and cylinder means are operatively connected to the shaft 266. A cross arm 280 is secured to and extends to either side of the shaft. Two arms 281 and 282 are pivotally secured to and hang downwardly from the opposite ends of the cross arm 280. The arms 281 and 282 engage the upper, dished surfaces of pistons 283 and 284 respectively, these pistons being vertically slidable within corresponding cylindrical bores 285 and 286 in a block 287 which is preferably formed integral with the base 200. The lower end of the cylinder 285 opens into a conduit 290, while the lower end of the cylinder 286 opens into a conduit 291, both conduits leading to the valve mechanism 255 as shown in Fig. 15.

A source of fluid under pressure is required for the operation of this embodiment of the invention. In the present embodiment of the invention compressed air is employed and is conducted from an external source to the gauge by a conduit 292, seen in the upper left hand portion of Fig. 12. This conduit preferably leads to a pressure regulator 293, a suitable form of which is disclosed in Fig. 16. In the form of pressure regulator illustrated, a plunger 294 is arranged within a cylinder 295, and a spring 296 urges the plunger downwardly. Suitable bores in the plunger 294 serve to connect the inlet conduit 292 with an outgoing conduit 297 which leads to the valve mechanism 255. As will readily be understood by those skilled in the art, when the pressure in the conduit 297 drops below a critical value, the spring 296 will drive the plunger 294 downwardly to start or increase the flow of air from the inlet conduit 292 to the outlet 297, and when the pressure in the conduit 297 is thereby raised above a critical value, the plunger 294 will move upwardly, against the influence of the spring 296, to cut off or reduce the flow of air from the conduit 292. Pressure within the conduit 297 may thereby be maintained very accurately at any reasonable desired value. Since the pressure regulator itself does not constitute a feature of the present invention, and may be of various forms well known in the art, it is not described in further detail herein.

Operation of the valve mechanism may best be described with reference to Fig. 15. When the plunger 257 is in its normal position with respect to the valve body 256, air from the conduit 297 enters an annular port 301 defined by annular lands 302 and 303 forming a part of the plunger 257. Radially outward of the lands 302 and 303 are corresponding annular ports 304 and 305 which are connected respectively to the lines 291 and 290 and, hence, to the cylinders 286 and 285.

It will be noted in Fig. 15 that the ports 304 and 305 are wider than the lands 302 and 303. Accordingly, when the valve is at or near its neutral or central position, as illustrated, air may pass from the port 301, around the land 303 through the port 305, and into another annular port 306 which connects to an exhaust opening 307. Similarly, air may pass from the port 301, around the land 302 through the port 304, and into another annular port 308 which is connected to an exhaust opening 309.

The principal restrictions to this flow of air from the inlet port 301 to the exhaust port 309 are the two narrow gaps designated $a$ and $b$ between the two lips of the land 302 and the adjacent lips defining the ports 304. Similarly, the principal restrictions to air flow from the inlet port 301 to the exhaust port 307 are the narrow gaps $c$ and $d$ between the lips of the land 303 and the adjacent lips defining the port 305. Accordingly, the pressure in the ports 304 and 305 will be intermediate the inlet pressure and the exhaust pressure, and if the lands 302 and 303 are centered with respect to the ports 304 and 305 the pressure in the ports 304 and 305 will approximately be half of the inlet pressure. In such case the pressures in the two cylinders 285 and 286 of Fig. 10 will be equal and the cross arm 280 and the lever 260 and the indicator arm 272 will remain stationary.

In the event that the valve member 257 is moved upwardly with respect to the valve body 256, as by upward movement of the arm 250 in response to application of a pin and a cylinder to the gauge, the gap $a$ will be narrowed and the gap $b$ will be increased. The greater pressure drop will therefore be across the gap $a$ and the pressure in the port 304 will rise. At the same time the gap $c$ will be narrowed and the gap $d$ will increase, lowering the pressure in the port 305.

Since the port 304 is connected to the cylinder 286 and the port 305 is connected to the cylinder 285, the piston 284 will rise and the piston 283 will descend in response to the differing pressures exerted against the lower faces of the pistons. This swings the indicator arm 272 downward and pivots the lever 260 counterclockwise about the pin 262 to raise the valve body 256.

Such motion will continue until the valve body has risen to the same extent as the valve member 257 such that the lands 302 and 303 are again centered with respect to the ports 304 and 305 respectively. Pressures in the ports 304 and 305 and in the cylinders 285 and 286 will then be equalized and movement will terminate.

It will be apparent that initial downward movement of the valve member 257 will result in action which is the reverse of that described above, the indicator arm 272 being moved upwardly and the valve body 256 moving downwardly until the lands 302 and 303 are again centered with respect to the ports 304 and 305.

Attention is directed to the fact that the individual lands 302 and 303 are not necessarily centered with respect to the individual ports 304 and 305 when the valve is in its neutral or balanced position. Rather the two lands are centered about a point intermediate the two ports. The lands may, for example, be arranged on more widely spaced centers than the ports. In this case the gaps $a$ and $d$ would be smaller than the gaps $b$ and $c$ under balanced conditions and the pressure in the ports 303 and 304 would be greater than when all four gaps are equal. Conversely, if the lands are spaced more closely, the pressure in the ports under balanced conditions would be less than when all gaps are equal.

In general, if the valve is so dimensioned that the various lands and ports thereof cooperate with each other as described above, various irregularities in dimensions and contour will have little or no effect on operation. The two valve elements will have one relative position in which port pressures are equal, and the associated apparatus will tend to cause the valve body 256 to follow the valve member 257 and to assume its neutral or balanced position with respect thereto.

A compression spring 310 is arranged between the upper end of the valve member 257 and the valve body 256 and applies opposed forces thereto which extend in one direction through the lever 260 and the gear 271 to the air within the cylinders 285 and 286, and in the other direction through the lever 250, the shaft 243 and the rod 239 and spindle 236 to the balls 80. This takes up slack in all joints between these extremities and thus minimizes the effect of this source of error. The force exerted by the spring 310 with the valve parts in normal position may be substantial in order that it may take up slack in the joints firmly. At the same time, the force applied to the balls 80 need not be excessive since the previously described spring 251 may bear any desired portion of the thrust imposed by the spring 310.

The force of the spring on the two valve parts shifts the neutral position of the valve to one in which the various lands and parts are not physically centered, the valve member 257 being below its physically centered position with respect to the valve body 256. This is not detrimental to the operation of the gauge since the two valve parts will always seek this resultant neutral position in which the net forces applied thereto are equal.

As in the case of the first described embodiment of the invention, standard pins P and cylinder C are preferably provided for calibrating the gauge to various sizes of pins and cylinders. Calibration may be effected by withdrawing the movable jaw 220 by manipulation of the handle 232 such that a standard pin of desired diameter may be placed within the jaws 220 and 221. The handle 232 is then released such that these jaws engage the standard pin and the spindle assumes a position corresponding to the diameter of the standard pin. The corresponding standard cylinder C is then slipped over the mandrel 235, causing actuation of the arm 250 and the valve mechanism 255 and the associated amplifying apparatus.

The gauge may then be calibrated by adjustment of the screw 268 such that the indicator 273 overlies the zero mark on the scale 274. Alternatively it may directly indicate the actual and desired difference in diameter of the standard pin and cylinder, but for the purpose of the present description it will be assumed that it is desired that the indicator 273 overlie the zero mark whereby the zero indication corresponds to the desired difference in diameter of the pin and cylinder.

If the indicator 273 does not directly overlie the zero mark, the apparatus is adjusted by loosening the thumb nut 270 and turning the thumb screw 268 until the indicator 273 is properly located. The thumb nut 270 is then tightened to secure the thumb screw 268 in its proper position. The gauge is then calibrated for the selected size of pin and cylinder and for the desired difference in diameter of the pin and cylinder. As in the case of the first described embodiment, the standard plug and ring may deviate substantially from the desired diameters as long as their diameters are known, such that the gauge may be calibrated accordingly.

Figure 18:
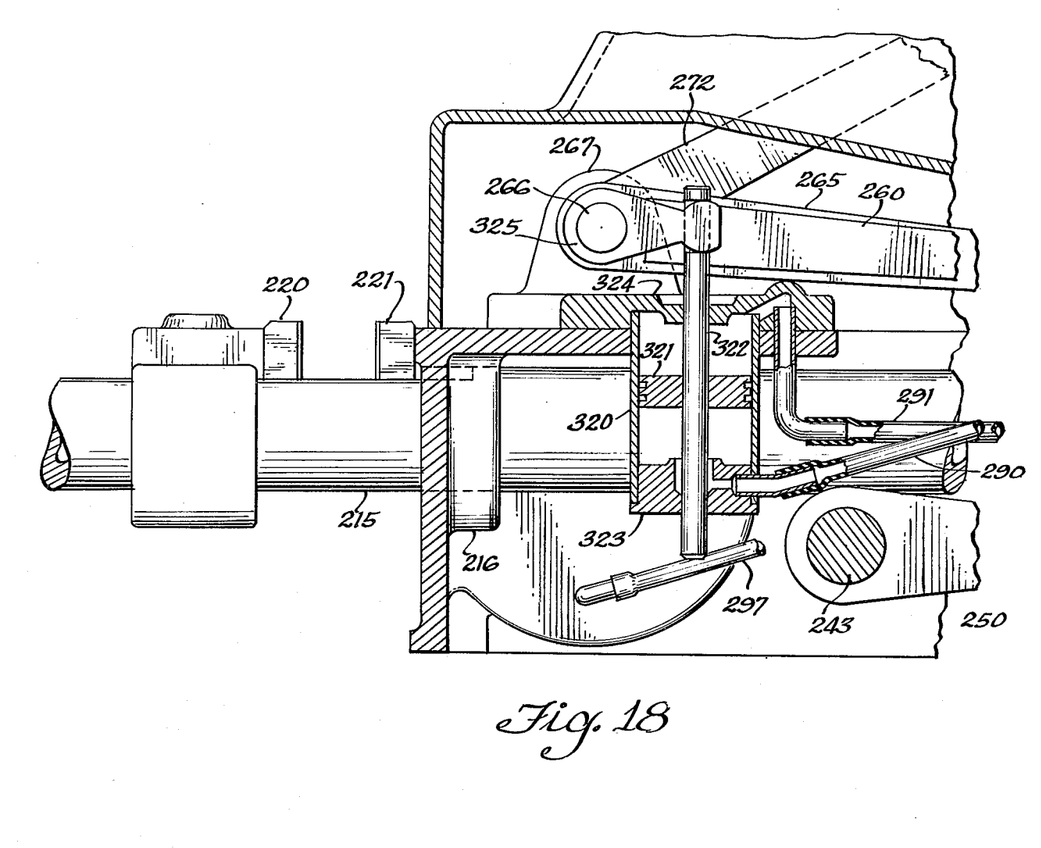
Fig. 18 is a view similar to Fig. 10 showing a modified construction of a part of the apparatus of Figs. 10–17.

In Fig. 18 there is shown a modification of the double acting piston and cylinder means included in the apparatus of Figs. 10–17. No modifications in the overall apparatus are required other than those parts referred to below and shown in Fig. 18.

A single cylinder 320 cooperates with a single piston 321 and piston rod 322, the piston rod being slidably supported in cylinder heads 323 and 324. The conduits 290 and 291 of Figs. 10–17 extending from the valve apparatus 255 lead to opposite sides of the piston 321 within the cylinder 320 as shown, whereby unbalanced pressures within these conduits cause the piston and piston rod to move upwardly or downwardly.

An arm 325 secured to the shaft 266 is connected to the piston rod 322 in any suitable manner such as that shown. It should be noted that this connection must permit relative pivotal movement of the piston rod 322 and the arm 325 as well as an appreciable amount of relative movement laterally of the piston rod. Movement of the double acting piston and cylinder means is thereby transmitted to the shaft 266 as in the embodiment of Figs. 10–17.

Figure 10:
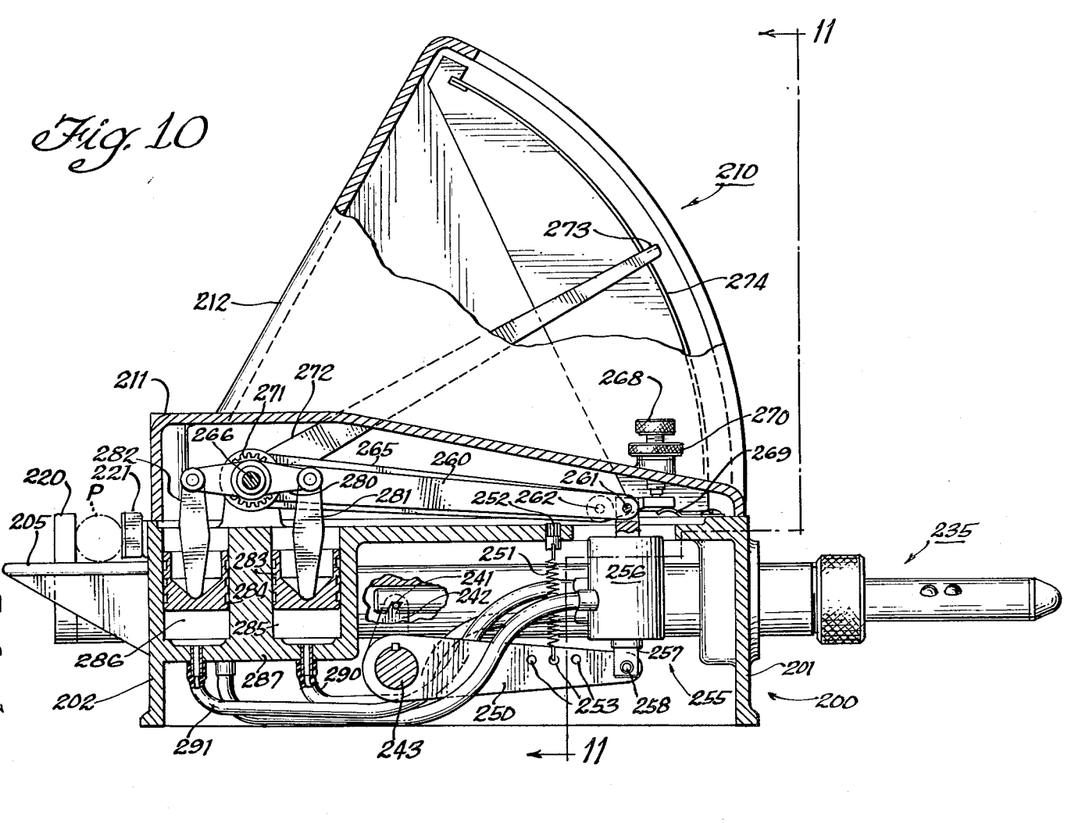
Fig. 10 is a side elevational view partly in cross section of a second embodiment of the invention; the section being taken along line 10—10 of Fig. 12.

The form of double acting cylinder and piston means disclosed in Fig. 18 has certain advantages over that shown in Fig. 10. One of the more significant of these is the reduction of force on the bearings 267 and a consequent reduction in friction. It will be noted that in Fig. 10 the force of both pistons is exerted against the cross arm 280 and the shaft 266, and hence against the bearings 26, whereas only the net force exerted on the piston rod 322 is transmitted to the associated arm 325.

A gauge constructed in accordance with any of the above described embodiments of the invention is inherently accurate because of the small number of moving parts and the mechanical advantage natural thereto. In this connection it should be noted particularly that the diameter of the pin being gauged determines the position of one movable member (the arbor 25 or 215) with respect to the base and that the diameter of the ring being gauged determines the position of another member (the pin 75 or 236) which is movable with respect to the first moving member. Accordingly the position of the second member with respect to the base is a function of the difference in the diameters of the pin and the ring. The two factors of interest, namely the diameter of the pin and the diameter of the ring, are therefore immediately combined into a single factor in the form of the position of the second movable member with respect to the base. One of the effects of so combining the moving parts into a single line, responsive to the difference between the pin diameter and the ring diameter, is of course a substantial reduction in friction of the moving parts. Another result of this novel construction is a single indicator responsive to this single line of moving parts, directly reading either the difference in diameters or the variation from the desired difference in diameters, without the necessity of any comparison of dual readings.

Another outstanding advantage of the present invention is the greatly amplified but still accurate indication of the difference in diameters which is produced by the relatively small movement of the single line of moving parts. In the case of the first embodiment shown in Figs. 1–9, there is a simple amplitude amplification whereas in the embodiment or embodiments of the invention disclosed in Figs. 10–18 there is a power amplification as well as an amplitude amplification. In the power amplification means incorporated in the apparatus of Figs. 10–18 a novel form of control apparatus is provided which is capable of extreme accuracy in spite of relatively large permissible manufacturing tolerances.

It will be apparent that the invention may be varied in its physical embodiment without departing from the spirit of the invention, and it is desired, therefore, that the invention be limited only by the scope of the appended claims.

The invention having thus been described, what is claimed and desired to be secured by Letters Patent is:

1. A gauge for indicating the difference in diameters of a pin and a bore comprising a base, a member movable linearly with respect to said base, a pair of pin gauging jaw elements secured one each to said base and said member, radially contractible and expansible bore gauging means carried by said member, an element carried by said member and linearly movable with respect thereto in a direction parallel to the direction of movement of said member with respect to said base, said element being operatively engaged with said bore gauging means and movable with respect to said member in response to radial movement of said bore gauging means, and fluid amplifying means for effecting a magnified visible indication of movement of said element with respect to said base.

2. A gauge for indicating the difference in diameters of a pin and a bore comprising a base, a member movable linearly with respect to said base, a pair of pin gauging jaw elements secured one each to said base and said member, radially contractible bore gauging means carried by said member, said means comprising a plurality of balls projecting radially outward of said member, an element carried by said member and linearly movable with respect thereto in a direction parallel to the direction of movement of said member with respect to said base, said element having one end tapered at an angle whose tangent equals .5 and engageable by said balls whereby said element is movable with respect to said member by contraction of said balls, and fluid amplifying means for effecting a magnified visible indication of movement of said element with respect to said base.

3. A gauge for indicating the difference in diameters of a pin and a bore comprising a base, a member movable linearly with respect to said base, a pair of pin gauging jaw elements secured one each to said base and said member, radially contractible bore gauging means carried by said member, said means comprising a plurality of balls projecting radially outward of said member, an element carried by said member and linearly movable with respect thereto in a direction parallel to the direction of movement of said member with respect to said base, said element having one end tapered at an angle whose tangent equals .5 and engageable by said balls whereby said element is movable with respect to said member by contraction of said balls, means pivotally mounted on said base and engageable with said element whereby said pivotal means may pivot in response to linear movement of said element with respect to said base, and fluid amplifying means for effecting a magnified visible indication of pivotal movement of said pivotal means.

4. A gauge for indicating the difference in diameters of a pin and a bore comprising a base, a member movable linearly with respect to said base, a pair of pin gauging jaw elements secured one each to said base and said member, radially contractible bore gauging means carried by said member, said means comprising a plurality of balls projecting radially outward of said member, an element carried by said member and linearly movable with respect thereto in a direction parallel to the direction of movement of said member with respect to said base, said element having one end tapered at an angle whose tangent equals .5 and engageable by said balls whereby said element is movable with respect to said member by contraction of said balls, means pivotally mounted on said base and engageable with said element whereby said pivotal means pivot in response to linear movement of said element with respect to said base, and means for effecting a visible indication of pivotal movement of said pivotal means.

5. A gauge for indicating the difference in diameters of a pin and a bore comprising a base, a member movable linearly with respect to said base, a pair of pin gauging jaw elements secured one each to said base and said member, radially contractible bore gauging means carried by said member, said means comprising a plurality of balls projecting radially outward of said member, an element carried by said member and linearly movable with respect thereto in a direction parallel to the direction of movement of said member with respect to said base, said element having one end tapered at an angle whose tangent equals .5 and engageable by said balls whereby said element is movable with respect to said member by contraction of said balls, means pivotally mounted on said base and engageable with said element whereby said pivotal means pivot in response to linear movement of said element with respect to said base, and fluid amplifying means for effecting a magnified visible indication of pivotal movement of said pivotal means, said fluid amplifying means including double acting means movable in response to opposed fluid pressures, indicating means responsive to movement of said double acting means, valve means responsive to movement of said pivotal member for causing an unbalance of said fluid pressures, and means responsive to movement of said double acting means for actuating said valve means to balance said fluid pressures.

6. A gauge for indicating the difference in diameters of a pin and a bore comprising a base, a member movable linearly with respect to said base, a pair of pin gauging jaw elements secured one each to said base and said member, radially contractible bore gauging means carried by said member, said means comprising a plurality of balls projecting radially outward of said member, an element carried by said member and linearly movable with respect thereto in a direction parallel to the direction of movement of said member with respect to said base, said element having one end tapered at an angle whose tangent equals .5 and engageable by said balls whereby said element is movable with respect to said member by contraction of said balls, means pivotally mounted on said base and engageable with said element whereby said pivotal means pivot in response to linear movement of said element with respect to said base, and fluid amplifying means for effecting a magnified visible indication of pivotal movement of said pivotal means, said fluid amplifying means including double acting piston and cylinder means responsive to opposed pneumatic pressures for controlling an indicator, valve means including a body portion and a valve portion, one of said portions being responsive to movement of said pivotal means for unbalancing said opposed pressures, and means responsive to movement of said piston and cylinder means for actuating the other of said portions to balance said pressures.

7. A gauge for indicating the difference in diameters of a pin and a bore comprising a base, a member movable linearly with respect to said base, a pair of pin gauging jaw elements secured one each to said base and said member, radially contractible bore gauging means carried by said member, said means comprising a plurality of balls projecting radially outward of said member, an element carried by said member and linearly movable with respect thereto in a direction parallel to the direction of movement of said member with respect to said base, said element having one tapered end engageable by said balls whereby said element is movable with respect to said member by contraction of said balls, means pivotally mounted on said base and engageable with said element whereby said pivotal means pivot in response to linear movement of said element with respect to said base, and amplifying means for effecting a magnified visible indication of pivotal movement of said pivotal means, said amplifying means comprising double-acting piston and cylinder means responsive to opposed air pressures for controlling an indicator, pressure control means responsive to movement of said pivotal means for controlling said opposed air pressures, and follow-up means responsive to movement of said double-acting piston and cylinder means for counteracting the effect of said pivotal means on said pressure control means when said piston and cylinder means have responded to said pressure control means.

8. A gauge for indicating the difference in diameters of a pin and a bore comprising a base, a member movable linearly with respect to said base, a pair of pin gauging jaw elements secured one each to said base and said member, radially contractible bore gauging means carried by said member, said means comprising a plurality of balls projecting radially outward of said member, an element carried by said member and linearly movable with respect thereto in a direction parallel to the direction of movement of said member with respect to said base, said element having one tapered end engageable by said balls whereby said element is movable with respect to said member by contraction of said balls, means pivotally mounted on said base and engageable with said element whereby said pivotal means pivot in response to linear movement of said element with respect to said base, and amplifying means for effecting a magnified visible indication of pivotal movement of said pivotal means, said amplifying means comprising double-acting piston and cylinder means responsive to opposed air pressures for controlling an indicator, pressure control means responsive to movement of said pivotal means for controlling said opposed air pressures, and follow-up means responsive to movement of said double-acting piston and cylinder means for counteracting the effect of said pivotal means on said pressure control means when said piston and cylinder means have responded to said pressure control means, said pressure control means including two relatively movable parts, one of said parts being operatively connected to said pivotal means and the other of said parts being operatively connected to said follow-up means, said two parts in combination defining an inlet port connectible to a source of air under pressure, first and second exhaust ports, a first passage connecting said inlet port to said first exhaust port, a second passage connecting said inlet port to said second exhaust port, a first tap in said first passage and connected to one side of said piston and cylinder means and a second tap in said second passage and connected to the other side of said piston and cylinder means, said parts also defining in combination two series arranged air flow restrictions in each of said passages one on either side of each of said taps, the effect of said restrictions being variable with relative movement of said parts whereby movement of said one part from a neutral position by said pivotal means produces unbalanced pressures applied to said piston and cylinder means and consequent movement of said piston and cylinder means and of said follow-up means whereby said second part is moved to relative neutral position wherein said pressures are equal.

9. The gauge of claim 7 wherein said piston and cylinder means includes a single cylinder and a double-faced piston.

10. A gauge for indicating the differences in diameters of a bore and a pin comprising a base, an arbor adjustably slidable on said base, a pair of jaws disposed with their faces in opposition, one of said jaws being fixed on said base, and the other carried by said arbor for movement therewith toward and away from said jaw, a plunger slidable in said arbor, contractible means projecting radially from said arbor for positioning said plunger in said arbor in accordance with the diameter of said contractible means, and means controlled in accordance with the position of said plunger relative to said fixed jaw for indicating the difference between the diameter of said contractible means and the distance between said jaw faces.

11. A gauge for indicating the difference in diameters of a pin and a bore comprising a base, a member movable linearly with respect to said base, a pair of pin gauging jaw elements secured one each to said base and said member, radially contractible and expansible bore gauging means carried by said member, an element carried by said member and linearly movable with respect thereto in a direction parallel to the direction of movement of said member with respect to said base, said element being operatively engaged with said bore gauging means and movable with respect to said member in response to radial movement of said bore gauging means, and means for effecting a visible indication of movement of said element with respect to said base.

12. In a gauge for indicating the difference in diameters of a pin and a bore and having a base and an element movable with respect to said base in accordance with such difference in diameters of a pin and a bore, amplifying means comprising double-acting piston and cylinder means responsive to opposed air pressures for controlling an indicator, pressure control means responsive to movement of said element for controlling said opposed air pressures, and follow-up means responsive to movement of said double-acting piston and cylinder means for counteracting the effect of said element on said pressure control means when said piston and cylinder means have responded to said pressure control means, said pressure control means including two relatively movable parts, one of said parts being operatively connected to said element and the other of said parts being operatively connected to said follow-up means, said two parts in combination defining an inlet port connectible to a source of air under pressure, first and second exhaust ports, a first passage connecting said inlet port to said first exhaust port, a second passage connecting said inlet port to said second exhaust port, a first tap in said first passage and connected to one side of said piston and cylinder means and a second tap in said second passage and connected to the other side of said piston and cylinder means, said parts also defining in combination two series arranged air flow restrictions in each of said passages one on either side of each of said taps, the effect of said restrictions being variable with relative movement of said parts whereby movement of said one part from a neutral position by said element produces unbalanced pressures applied to said piston and cylinder means and consequent movement of said piston and cylinder means and of said follow-up means whereby said second part is moved to relative neutral position wherein said pressures are equal.

13. The gauge of claim 6 wherein spring means are connected between said two portions of said valve means and bias said portions against said pivotal means and said responsive means.

References Cited in the file of this patent

UNITED STATES PATENTS 1,274,331    Rockwell  ---------------  July 30, 1918

(Other references on following page)

UNITED STATES PATENTS

| | | |
|---|---|---|
| 1,679,362 | Knowlton | Aug. 7, 1928 |
| 1,893,205 | Hughes | Jan. 3, 1933 |
| 2,369,319 | Smith | Feb. 13, 1945 |
| 2,374,154 | Moore | Apr. 17, 1945 |
| 2,467,847 | Mozur | Apr. 19, 1949 |
| 2,675,621 | Mims | Apr. 20, 1954 |
| 2,767,477 | Esken | Oct. 23, 1956 |

FOREIGN PATENTS

| | | |
|---|---|---|
| 535,878 | Germany | Oct. 16, 1931 |
| 204,788 | Austria | Dec. 12, 1956 |